United States Patent

Tanaka

Patent Number: 5,253,338
Date of Patent: Oct. 12, 1993

[54] SEMI-AUTOMATIC IMAGE TRACING METHOD

[75] Inventor: Yutaka Tanaka, Yokohama, Japan

[73] Assignee: Hitachi Software Engineering Co., Ltd., Yokohama, Japan

[21] Appl. No.: 610,153

[22] Filed: Nov. 7, 1990

[30] Foreign Application Priority Data

Nov. 8, 1989 [JP] Japan .................... 1-291750

[51] Int. Cl.$^5$ ............................ G06F 15/42
[52] U.S. Cl. .................... 395/161; 395/155; 395/139
[58] Field of Search ............... 395/133, 139, 155, 161; 340/731, 723, 747

[56] References Cited

U.S. PATENT DOCUMENTS 4,202,037  5/1980  Glaser et al. ............... 364/518
4,633,416  12/1986 Walker ....................... 395/155
4,688,181  8/1987  Cottrell et al. ............. 364/521

Primary Examiner—Phu K. Nguyen
Attorney, Agent, or Firm—Fay, Sharpe, Beall, Fagan, Minnich & McKee

[57] ABSTRACT

A semi-automatic image tracing method for a graphics processing device adapted to implement tracing an image semi-automatically involves starting tracing the image upon designation for tracing, tracing the image points in accordance with trace conditions for the control data in a parameter table, and interrupting the tracing at every branch point of the trace path at which designation affecting continued tracing by the operator is required. When the tracing is interrupted, the image data in the neighborhood of the branch point is displayed on a display unit in an enlarged manner by a branch-point neighborhood display processing section. The operator makes a designation to continue the trace processing. A switch is operatively controlled at the branch point which is involved with the control of the trace path of the image, in accordance with a predetermined control data of the parameter table. This allows the branch-point neighborhood display processing unit to make an enlarged display of an area in the neighborhood of the branch point on an auxiliary view port disposed separately from a main view port.

6 Claims, 5 Drawing Sheets

FIG. 2

|  | PARAMETER & SWITCH | SET VALUE |
|---|---|---|
| TRACE | Max Width (dot) | 10 |
|  | Gap (dot) | 2 |
|  | Step (dot) | 5 |
| FLOW | Skip Intersection Number | 3 |
|  | Branch Priority | straight |
|  | Action at Line End | manual |
|  | Point Display | yes |
| ADJUST | Straighten | 2.0 |
|  | Corner | 10 |
|  | Angle | 0 |
|  | Closing | 0 |
| ATTRIBUTE | Color | green |
|  | Layer | current |
|  | Line | solid |

SEMI-AUTOMATIC IMAGE TRACING METHOD

BACKGROUND OF THE INVENTION

The present invention relates to a semi-automatic image tracing method and, more particularly, to a semi-automatic image tracing method adaptable to graphics processing devices, such as a computer-aided design (CAD) device or the like, which comprises semi-automatically tracing image points of an image data while carrying out a switching control for continuing the tracing processing by determining tracing conditions at a branch point of a tracing path as well as confirming the tracing path.

Heretofore, pictures drawn on paper have been inputted into a graphics processing system as image data by means of an image scanner or the like. The image data are then displayed on a display screen through the graphics processing system and the operator has manually inputted through a pointing device or the like by tracing the image data on the screen.

For example, Japanese Patent Unexamined Publication (kokai) No. 62-269,276/1987 discloses an interactive graphics input system in which a picture is scanned by an image scanner and once inputted into a computer as image data which in turn is displayed on a display screen while superposing center line image data on the image data, and inputting the graphics as vector data by designating the positions required for the graphics on the display screen by means of a coordinates designator.

In converting the image data into the graphics data (coordinate points data) such as vector data, for example, in the manner as described hereinabove, the center data for the center or center line of the image is first given and then necessary data such as an end point, branch point or corner point as the characteristic point of the image is selected from the center data and such necessary data is inputted. In this case, in the conventional technique, the characteristic points have been inputted while the center data is superposed on the image data on the display screen. Hence, the display screen is forced to become so complicated that the operator has failed to select necessary data in an efficient way.

Further, there has been developed a graphics processor of a type having a semi-automatical line-tracing function so arranged as to semi-automatically trace image points, decide a characteristic point of the image points and input a graphic data of the characteristic point.

When the characteristic point of the image traced in a semi-automatic fashion, such a semi-automatical line-tracing function for the graphics processor is so designed as to allow various parameters acting as control data for semi-automatically tracing to be altered with every image to be traced, such parameters including an image tracing parameter for tracing the image, a trace-result correcting parameter, and so on. However, a switch to be employed for controlling the tracing of the image is set uniformly in advance, so that the switch cannot be altered with every image. Further, the semi-automatically tracing processing employs a main view port displaying a whole tracing area for confirming a tracing process of the tracing path. Hence, the detail of the tracing path is to be confirmed by shifting display screens and enlarging the details of the tracing path.

It is to be noted, however, that when a characteristic point of the image, such as an end point, a branch point and so on, is determined and inputted as graphic data as a result of tracing the image data semi-automatically by means of the semi-automatical tracing function of the graphics processor, the conventional function is so designed as to trace the image and branch the tracing path into a branched direction uniformly defined in advance upon the detection of a branch point, for example, so that no attention is paid to the instance where the tracing path is intended to be partially branched into an exceptional direction other than the predetermined tracing branch path. Hence, the exceptional portion is required to be corrected individually after the semi-automatic tracing has been finished. Further, if the graphics or image to be traced would be too big or too complicated as compared with the display area of the view port, the detail of the tracing path cannot be confirmed because the whole area of the tracing path is displayed in order to confirm the tracing path during the tracing operation. Therefore, in order to confirm and correct the detail of the tracing path, the detail is enlarged after the tracing of the image has been done. This operation is so complicated.

SUMMARY OF THE INVENTION

Therefore, it is an object of the present invention to provide a semi-automatic image tracing method for the graphics processing device, in which the image points of the image data are traced in a semi-automatic fashion and a switch control is so arranged as to continue the tracing upon a decision made on the tracing conditions at the branch point of the tracing path, thereby tracing the image points of the image data while confirming the tracing path.

In order to achieve the aforesaid object, the present invention consists of a semi-automatic image tracing method for a graphics processing device having an image data storing unit for storing image data, a graphic data storing unit for storing graphic data, a display unit for displaying the image data and the graphic data, a trace designation inputting unit for inputting the designation for tracing, and a semi-automatic image trace processing unit disposed so as to trace image points of the image data according to the designation for tracing, further comprising a parameter table for providing control data on a condition for tracing the image points of the image data and for providing control data on correction processing by the result of tracing and further comprising a branch-point neighborhood display processing unit for enlarging and displaying the image in the neighborhood of a branch point for tracing; which comprises:
  tracing the image points of the image data according to the control data of the parameter table in response to the designation for tracing;
  interrupting trace processing at every branch point of the tracing path at which the designation by the operator is required on the way of tracing;
  enlarging a display of the image data in the neighborhood of the branch point;
  waiting for the designation for tracing by the operator to be made next; and
  continuing the trace processing due to the next designation for tracing.

In the graphics processor, the trace processing for the image starts upon the designation for tracing and implements tracing the image points according to the tracing conditions set in the control data of the parameter table, and is caused to be interrupted at every branch point of the tracing path at which the designation by the operator is required during the trace processing. As the trace processing is interrupted, the image data in the neighborhood of the branch point is enlarged and displayed by the branch-point neighborhood display processing section to thereby wait for the designation for tracing from the operator to be made next, and the trace processing is continued upon the next designation for tracing. In tracing the image in a semi-automatic fashion in the manner as described hereinabove, the switch control is carried out in accordance with the control data in the parameter table, for example, at the branch point at which the tracing path of the image is to be controlled. At this time, in order to allow the operator to readily input the designation for selecting the tracing path continued with go, the branch-point neighborhood display processing unit is so arranged as to enlarge and display the neighborhood area in the vicinity of the branch point on an auxiliary view port disposed separately from the main view port for displaying the whole area of the tracing path.

Switching data for determining the tracing conditions of the control data in the parameter table comprises a trace suspending switch for determining the condition for suspending the trace processing, a branch switch for determining the direction for branching, and a trace starting switch for determining the condition for starting the trace processing in an automatic fashion. Further, the control data in the parameter table is provided with parameter data for determining the condition for adjusting the graphic data to be corrected due to the result of tracing and with parameter data for determining the attribute of the graphic data, thereby allowing the graphic data to be adjusted and have the attribute as a result of the trace processing.

The trace starting switch is a control switch so arranged as to determine whether the trace processing is to automatically start in a direction predetermined at the time when the image to be traced is detected or the trace processing is to start in the direction upon the interactive designation from the operator. The branch switch is a control switch so arranged as to determine the direction of branching automatically in accordance with the predetermined branch direction upon the detection of the branch point or to determine the direction of branching upon the interactive designation from the operator. The trace suspending switch is a control switch so arranged as to determine whether to automatically suspend the trace processing upon the detection of the end point or to suspend the trace processing upon the interactive designation from the operator or continue to allow the trace processing in an interactive mode.

With the aforesaid arrangement, when the tracing path of the image is defined uniformly in implementing the trace processing, on the one hand, the data on the control switch for determining the tracing conditions for the tracing path is so set as to automatically decide the tracing path at every branch point, thereby finishing the trace processing. When the tracing path of the image cannot be defined uniformly in implementing the trace processing, on the other hand, the data on the control switch for controlling the tracing path is so designated in an interactive mode as to allow the tracing path to be selected on an interactive basis at the selective control of the control switch for selecting the tracing path. In this case, whenever the tip of the tracing path of the graphics or the image reaches its branch point, the tracing is once interrupted and temporarily suspended at the branch point in order to allow a selection of the tracing path. At this time, a display of the area or portion in the neighborhood or vicinity of the branch point is enlarged on the auxiliary view port disposed separately from the main view port on which the whole area of the tracing path is displayed. This arrangement permits ready confirmation of the branch which is sensitive and complicated to select the right tracing path. Further, this arrangement can save laborious work on the processing for confirmation and correction of the detail of the tracing path, which is otherwise required in conventional techniques after the termination of the trace processing.

BRIEF DESCRIPTION OF THE DRAWINGS

FIG. 2 is a diagrammatic representation showing an example of parameters and control data on switches set in the parameter table.

DESCRIPTION OF THE PREFERRED EMBODIMENTS

Figure 1:
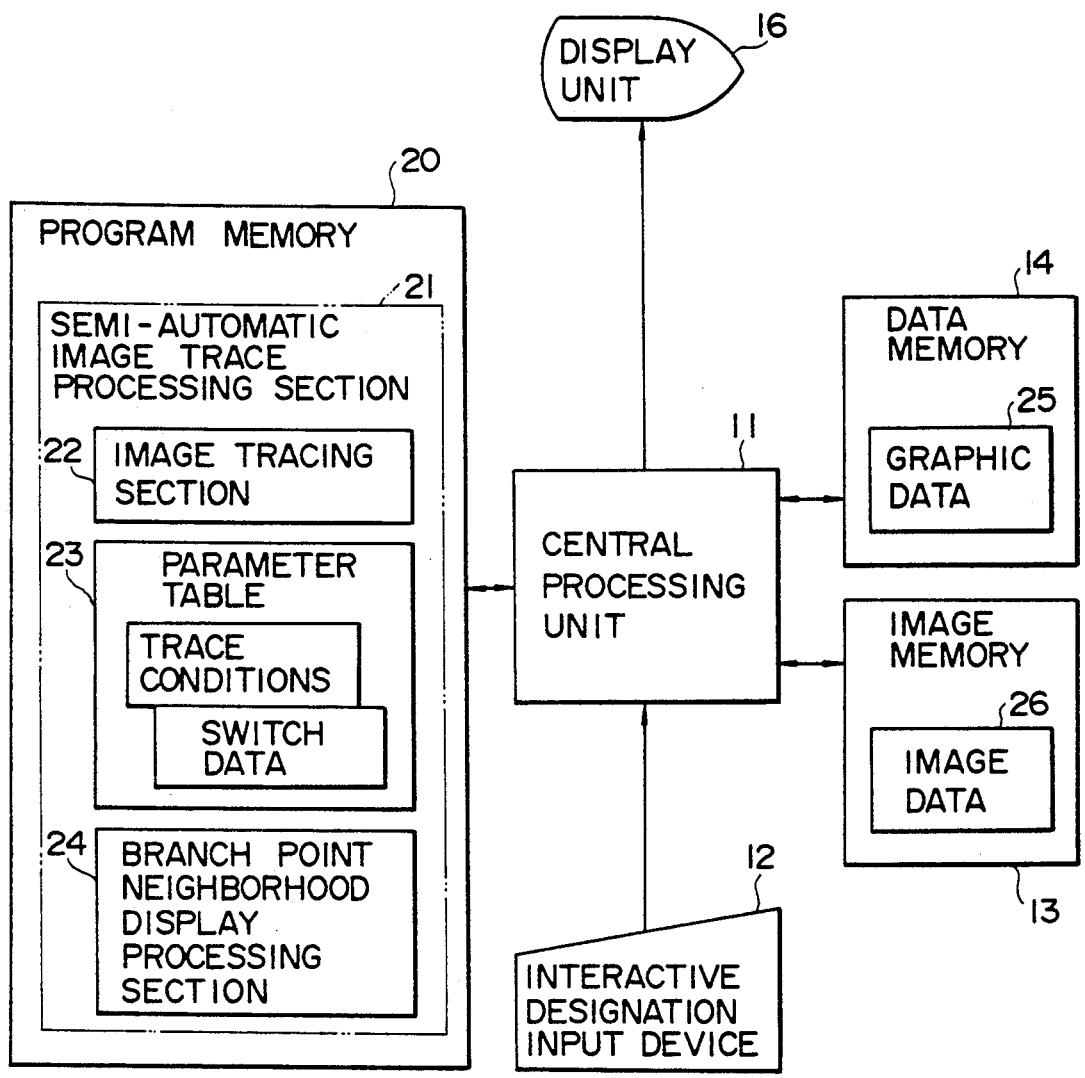
FIG. 1 is a block diagram illustrating the construction of the graphics processing device according to an embodiment of the present invention.

Referring to FIG. 1 directed to the block diagram illustrating the construction of the graphics processor to which an embodiment of the semi-automatic image tracing method according to the present invention is applied, the graphics processor comprises a central processing unit 11 for implementing a variety of processing, a program memory 20 for storing a program required for the processing to be implemented by the central processing unit 11, an image memory 13 for storing an image data 26 to be the object for digitizing, a data memory 14 for storing a graphic data 25 as the result of digitizing, an interactive designation inputting device 12 for inputting the interactive designation from the operator, and a display unit 16 for displaying the image data 26 and the graphic data 25.

The program memory 20 stores the program for a semi-automatic image trace processing unit 21 which implements a variety of graphic operations, and the semi-automatic image processing section 21 comprises an image tracing section 22 for tracing the image in a semi-automatic fashion, a parameter table 23 for providing a control data on the tracing condition for tracing the image points and a control data on the correction processing due to the result of tracing, and a branch-point neighborhood display processing section 24 for enlarging a display of the area or portion in the neighborhood or vicinity of the branch point at the time of selecting the tracing path on an interactive basis. The parameter table 23 contains parameter data for the tracing conditions, such as a parameter data for determining the order of priority of the tracing path to be traced, parameter data for adjusting the result of tracing, and parameter data for adding the attribute to the result of tracing, and switch data for controlling the tracing path of the image at the branch points or the like in the semi-automatic trace processing as well.

Figure 4:
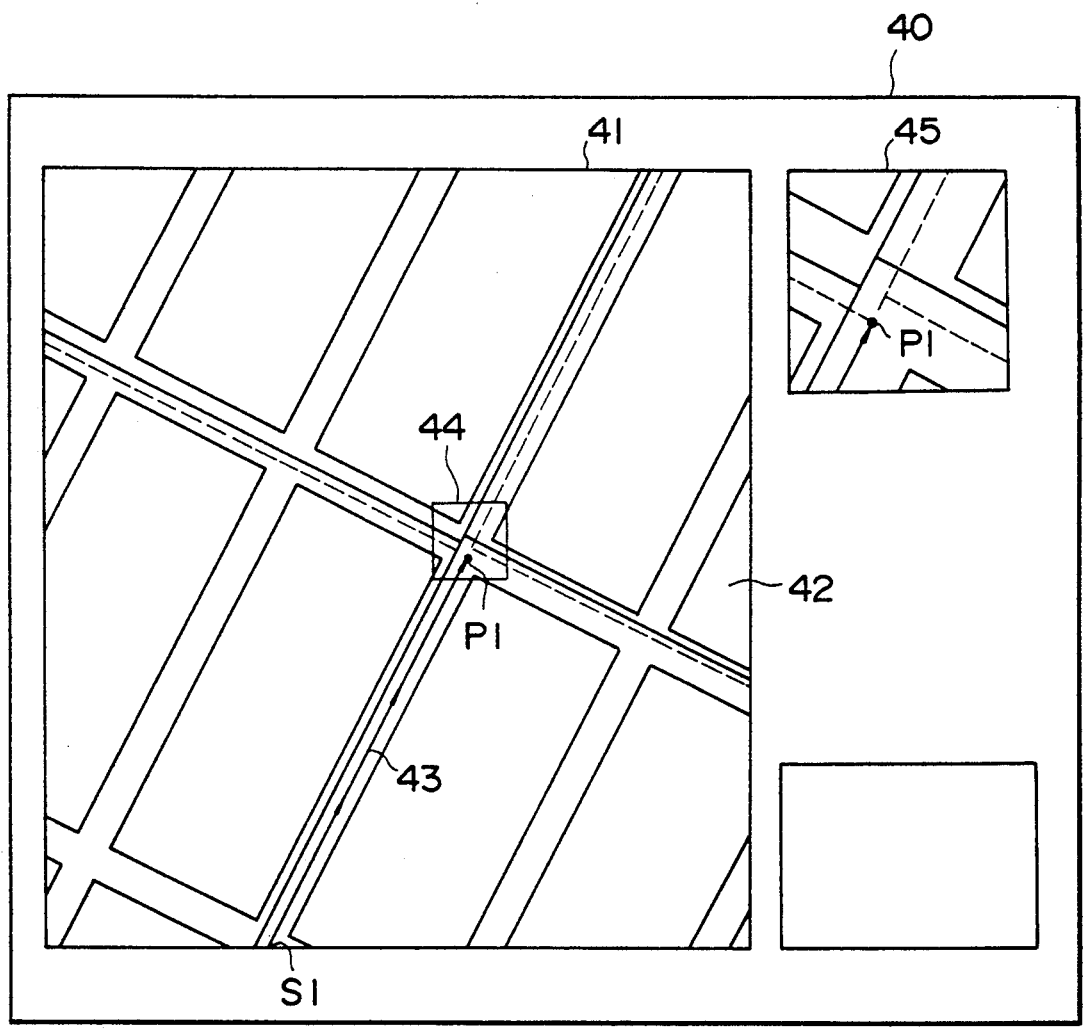
FIG. 4 is a diagrammatic representation showing an example of a display screen to be displayed upon the semi-automatic trace processing.
Figure 5:
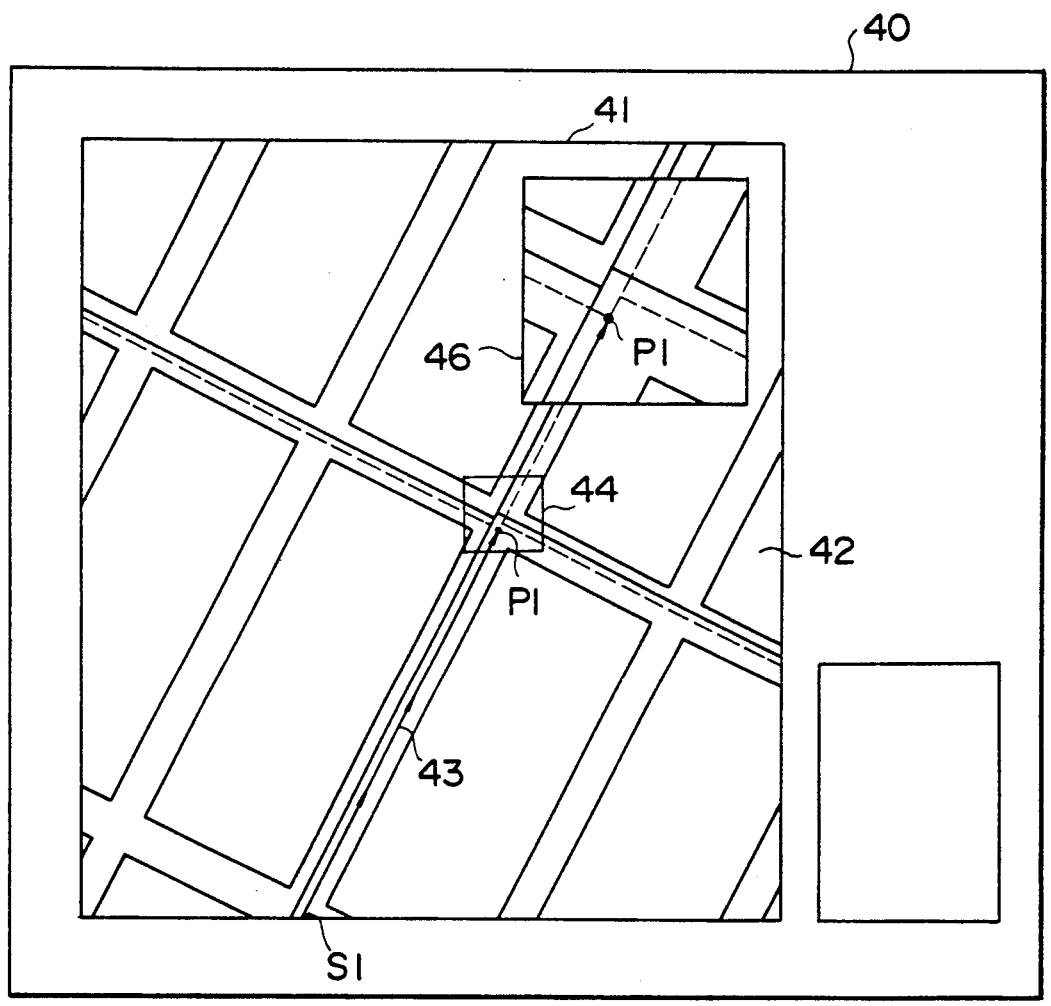
FIG. 5 is a diagrammatic representation showing another example of a display screen to be displayed upon the semi-automatic trace processing.

The central processing unit 11 is to implement the trace processing of the image by reading the image data 25 on the basis of the semi-automatic image trace processing section 21 in the program memory 20. The image tracing section 22 implements the semi-automatic trace processing in accordance with the tracing conditions set in the control data in the parameter table 23. And when the trace processing has reached a branch point or the like, the trace processing is interrupted and a display of the area or portion in the neighborhood of the branch point is enlarged by the branch-point neighborhood display processing section 24, when the trace path should be selected on an interactive basis. The enlarged display of the neighborhood area of the branch point is made on the auxiliary view port disposed separately from the main view port on which the whole area of the trace path is to be displayed, as shown in FIGS. 4 and 5. With this arrangement, the operator can give the designation for tracing through the interactive designation inputting device 12 while reference is made to the enlarged display of the area in the neighborhood of the branch point and the image tracing section 22 continues tracing the image, for example, by changing the direction of tracing upon the input designation.

FIG. 2 diagrammatically represents a specific example of the parameters and the switches as the control data to be set in the parameter table 23.

As shown in FIG. 2, for example, as the control data to be set in the parameter table 23, the parameters for the tracing conditions to be operated by TRACE Command include the maximum width (Max Width) of the image points (dots) to be traced as a result of a decision made that there is a line, the size of a gap (Gap) to be traced as a result of a decision made that the line is continuous by neglecting missing dots of a line image and a distance (Step) to be checked by the trace processing. As the data for the control switches relating to the trace path at the branch point to be operated by FLOW Command, there are set the number of branch points which the trace path skips in continuously implementing the tracing semi-automatically (Skip Intersection Number), the direction of branching having the priority to proceed with the trace path at the branch point (Branch Priority), the designation of a processing mode at the end terminal of the trace processing (Action at Line End), and the designation to be given to the tracing data as to whether to display a structuring point after tracing (Point Display).

As the control data for the correction processing based on the result of tracing to be operated by ADJUST Command for providing the adjust conditions, there have been set the number of dots for the range of the tolerance in order to be accepted as a straight line (Straighten), the number of dots for the tolerance length of chamfer segment in order to be accepted as a corner portion (Corner), the range of the tolerance angle of deviation in order to be accepted as a corner portion (Angle), and an accepted closing range in order to make a graphic form closed by connecting the end point by tracing (Closing). Further, as the control data for providing the attribute to the graphic data such as a line as the result of tracing, ATTRIBUTE Command includes a color (Color), a layer in which the graphic data as the result of tracing is allocated (Layer), and the kind of lines, such as a solid line, a broken line, one-dotted chain line or the like (Line).

The parameters of those items are set in the parameter table 23 in advance and the trace processing is implemented in a semi-automatic fashion.

Figure 3:
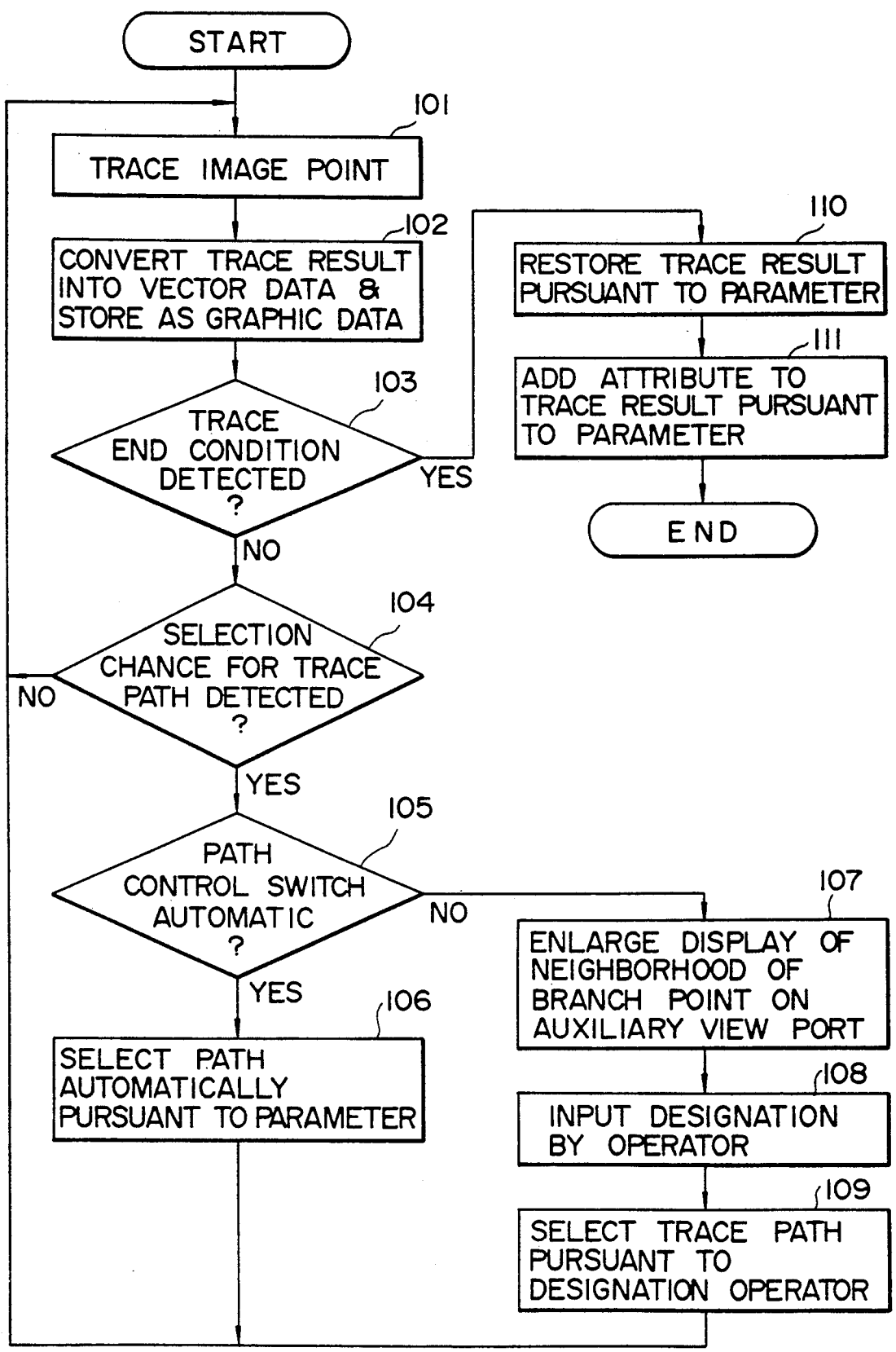
FIG. 3 is a flowchart showing the processing flow to be processed by semi-automatically tracing the image.

FIG. 3 illustrates the flowchart for implementing the trace processing of the image in a semi-automatic way. FIG. 4 illustrates an example of the display screen to be displayed during the semi-automatic image trace processing.

Description will now be made of the operation of selecting the trace path for tracing the image in a semi-automatic way with reference to FIGS. 3 and 4.

As shown in FIG. 4, the display screen 40 of the display unit 16 has the main view port 41 on which the image data 42 is displayed. The central processing unit 11 is so designed as to trace semi-automatically the image data 42 displayed on the main view port 41 on the basis of the program stored in the semi-automatic image trace processing section 21.

In the semi-automatic image trace processing, as shown in FIG. 3, at step 101, the image points (dots) of the image to be the object for tracing are traced. At this time, a locus 43 of tracing is simultaneously displayed on the image data 42 on the main view port 41 displayed on the display screen 40. After the image points have been traced in a predetermined range defined by the trace conditions, the program flow goes to step 102 at which the result of tracing is converted into vector data and stored as the graphic data 25 in the data memory 14. The result of tracing is subjected to decision processing at steps 103, 104 and 105. In other words, at step 103, a decision is made to determine if the trace end condition has been detected. When no trace end condition has been detected by the decision processing at step 103, then the program flow goes to step 104 at which a decision is further made to determine if the selection chance for the trace path (branch point or the like) has been detected. When it is decided at step 104 that no selection chance therefor has been detected, too, the program flow is returned to step 101 and the trace processing is repeated.

When the result of decision at step 104 indicates that the selection chance for the trace path has been detected, on the other hand, the program flow goes to step 105 and a decision is made here to determine if the path control switch is set automatically by reading the status of the control switch for the trace path in correspondence with the kind of the selection chance for the trace path from the parameter table 23. When the result of decision at step 105 indicates that the path control switch is set to be automatic, on the one hand, the program flow goes to step 106 at which the trace path is automatically selected in accordance with the trace conditions corresponding to the parameters set in the parameter table 23, in other words, at which the direction of branching is selected, for example, followed by the return to step 101 from which the trace processing is repeated to continue the automatic trace processing. If the result of decision at step 105 indicates that the path control switch is not set to be automatic, on the other hand, this means that the trace processing is to be implemented on an interactive basis, so that the program flow proceeds to step 107 at which the trace path is controlled in an interactive mode.

At step 107, for example, as shown in FIG. 4, a constant range in the neighborhood of a branch point P1 containing the branch point P1 is enlarged and displayed on the auxiliary view port 45. This enlarged display is conducted by the branch-point neighborhood display processing section 24. Thereafter, the program flow goes to step 108 at which the designation is inputted by the operator, followed by proceeding to step 109 at which the trace path is selected in accordance with the designation by the operator and by the return of the program flow by step 101 for repeating the trace processing.

When the result of decision at step 103 indicates that the trace end condition has been detected, the program flow goes to step 110 at which the trace result is adjusted in accordance with the parameters for the adjust conditions for the graphic data stored in the parameter table 23. This is the processing for adjusting the graphic data 25 by fetching it from the data memory 14. Then, at step 111, the attribute is added to the result of tracing in accordance with the parameters for providing the attribute stored in the parameter table 23, followed by storing the graphic data 25 in the data memory 14 again, thereby concluding the semi-automatic image trace processing.

As described hereinabove, in this embodiment, the trace path can automatically be selected when the trace path of the image can be defined uniformly by the switching operation so as to designate the control switch by the data in the parameter table in association with the switching function for controlling the trace path in tracing the image in a semi-automatic fashion. On the other hand, if the trace path of the image cannot be defined uniformly, the trace path can be designated on an interactive basis when the designation of the trace path is required. As described hereinabove, the trace processing can be continued while the trace path is selected by the interactive designation whenever the trace path reaches the branch points one after another. In this case, the image in the neighborhood of the branch point is displayed in an enlarged manner on the auxiliary view port disposed separately from the main view port on which the whole area of the trace range is displayed, so that the operator can accurately select the direction of branching while looking at the display on the auxiliary view port, thereby saving laborious work for confirmation of the detail of the trace path or correction of an error in the trace path, which has been otherwise required in conventional techniques.

FIG. 5 is a diagrammatic representation showing another example of the display screen to be displayed in the semi-automatic trace processing. The example of the display screen as shown in FIG. 5 is similar to the example of the display screen as shown in FIG. 4, except for the manner in which the auxiliary view port 46 is opened as a sub-window in the main view port 41. In this example, the auxiliary view port 46 is opened as the sub-window in a position in the vicinity of the branch point P1 the neighborhood of which is to be displayed in an enlarged fashion on the auxiliary view port 46. This type of the auxiliary view port 46 allows better correspondence of the branch point P1 displayed on the main view port 41 with the branch point P1 displayed in an enlarged way. Further, this way of display can provide the sense of direction for the enlarged image display on the auxiliary view port 46 in the same manner as the sense of direction for the image display on the main view port 41 on which the whole area of the trace path is displayed, thereby allowing the operator to avoid an error in giving the designation of the direction for the trace path.

The present invention has been described hereinabove by way of examples, but it is to be understood as a matter of course that the present invention is construed to be not limited to those examples, but to be illustrative, and various modifications and changes are encompassed within the scope and the spirit of the present invention.

As described hereinabove, the semi-automatic image tracing method according to the present invention allows the graphics processor to designate the switch for controlling the trace path of the image and shift the switch in implementing the processing of tracing the image in a semi-automatic way, thereby defining the trace path in a uniform manner and, alternatively, to designate the digitizing path on an interactive basis. In this case, the area or portion in the neighborhood of every branch point at a junction where the paths are connected to each other can be displayed in an enlarged fashion, so that the operator can accurately select the direction in which the trace path is branched. This type of the semi-automatic image trace processing can save laborious work required for confirmation of the detail of the trace path and correction of an error in the trace path after tracing.

What is claimed is:

1. A semi-automatic image tracing method for a graphics processing device having an image data storing unit for storing image data, a graphic data storing unit for storing graphic data, a display unit for displaying the image data and the graphic data, a trace designation inputting unit for inputting a designation for tracing, and a semi-automatic image trace processing unit disposed so as to trace image points of the image data according to the designation for tracing, further comprising a parameter table for providing control data on a condition for tracing the image points of the image data and for providing control data on correction processing by the result of tracing and further comprising a branch-point neighborhood display processing unit for enlarging and displaying the image in the neighborhood of a branch point for tracing; which comprises:

tracing the image points of the image data according to the control data of the parameter table in response to the designation for tracing;

interrupting trace processing at each branch point in the tracing path at which a designation affecting continued tracing by the operator is required;

enlarging a display of the image data in the neighborhood of said each branch point;

waiting for the designation affecting continued tracing to be input by the operator following the interrupting; and continuing the trace processing in response to the designation affecting continued tracing input by the operator.

2. A semi-automatic image tracing method as claimed in claim 1, wherein the display unit comprises a main view port for displaying a whole are of the tracing path on a display screen and an auxiliary view port for displaying a partially enlarged display of a portion of the tracing path on a display screen, thereby displaying a combination of the image data and the graphic data on the respective view ports.

3. A semi-automatic image tracing method as claimed in claim 1, wherein the display unit comprises a main view port for displaying a whole area of the tracing path on a display screen and an auxiliary view port for displaying a partially enlarged display of a portion of the tracing path on a display screen, thereby allowing the main view port to display the whole area of the tracing path in combination with the image data and the graphic data, and wherein an enlarged display of the image data in an area in the neighborhood of said each branch point is made on the auxiliary view port when the tracing is interrupted in said interrupting step.

4. A semi-automatic image tracing method as claimed in claim 1, wherein the display unit comprises a main view port for displaying a whole area of the tracing path on a display screen and an auxiliary view port for displaying a partially enlarged display of a portion of the tracing path on a display screen, thereby allowing the main view port to display the whole area of the tracing path in combination with the image data and the graphic data, and wherein the auxiliary view port is opened as a sub-window on the main view port and an enlarged display of the image data in an area in the neighborhood of said each branch point is made on the auxiliary view port when the tracing is interrupted in said interrupting step.

5. A semi-automatic image tracing method as claimed in claim 1, wherein the control data in the parameter table comprises switch data for determining a trace condition for every branch point, parameter data for determining an adjust condition for the graphic data for implementing correction processing by the result of tracing, and parameter data for determining the attribute of the graphic data, and said switch data comprises data for a trace end switch for further determining a condition for ending the tracing, data for a branch switch for determining the direction of branching, and data for a trace start switch for determining a condition for starting the tracing in an automatic way.

6. A semi-automatic image tracing method as claimed in claim 5, wherein:

the data for the trace start switch is data for a control switch for determining whether to start tracing automatically in a predetermined direction at the time when the image to be traced is detected or to start tracing in a direction determined by the operator;

the data for the branch switch is data for a control switch for determining whether to branch automatically the trace path into a predetermined direction at the time when the image to be traced is detected or to branch the trace path into a direction determined by the operator; and the data of the trace end switch is data for a trace end switch for determining whether to end the semi-automatic image trace processing automatically at the time when an end point is detected or whether to end the trace processing by operator input and allow drawing in an interactive mode.

* * * * *